United States Patent

[11] 3,587,682

| [72] | Inventors | Roy D. Brownell<br>Aurora;<br>Richard E. Rogers, Oswego, Ill. |
|---|---|---|
| [21] | Appl. No. | 794,041 |
| [22] | Filed | Jan. 27, 1969 |
| [45] | Patented | June 28, 1971 |
| [73] | Assignee | Baldwin-Lima-Hamilton Corporation<br>Chicago, Ill. |

[54] TREE HARVESTER BOOM ELEVATION CONTROL
11 Claims, 3 Drawing Figs.

[52] U.S. Cl. .................................................. 144/3
[51] Int. Cl. .................................................. A01g 23/02
[50] Field of Search .................................. 144/2 (21), 3 (4), 34, 309 (34)

[56] References Cited
UNITED STATES PATENTS
2,583,971  1/1952  Shuff ........................... 144/208

*Primary Examiner*—Gerald A. Dost
*Attorneys*—Carl C. Batz and Andrew J. Beck

ABSTRACT: A tree harvesting apparatus adapted to sever a standing tree into a plurality of sections, the apparatus including a tree severing means supported on a telescopic boom vertically pivotable connected to a vehicle. To automatically position severing means at a proper elevation for topping the tree, a control means is provided for controlling the number of sections to be severed from the tree and for controlling elevation of the severing means above ground level according to a predetermined elevation independent of orientation of the vehicle relative to the tree.

INVENTORS
ROY D. BROWNELL
RICHARD E. ROGERS

*Carl C. Batz*
ATTY.

PATENTED JUN28 1971 3,587,682

INVENTORS
ROY D. BROWNELL
RICHARD E. ROGERS

Carl C. Batz
ATTY.

TREE HARVESTER BOOM ELEVATION CONTROL

BACKGROUND OF THE INVENTION

This invention relates to tree harvesting, and more particularly to automatic controls for utilization in a tree harvesting process.

In Applicant's assignee's copending application, Ser. No. 692,749 by Sutherland, filed Dec. 22, 1967, now abandoned a novel tree harvesting and processing apparatus is disclosed wherein a tree severing device is supported on a vehicle by a telescopic crane-type boom. The tree severing device includes vertically spaced, relatively moveable, upper and lower tree shears, the upper shear being utilized to initially removes the commercially unusable tree top from a standing tree and to subsequently delimb and sever or buck the commercially usable portions of a tree into a plurality of sections or bolts of an equal length. Finally, the lower shear is utilized to sever the last bolt from the tree stump leaving as little stumpage as possible. This operation may be performed automatically in proper sequence by a hydraulic control means which causes the device to automatically descent a standing tree in a step-by-step manner.

In operations such as pulpwood harvesting to secure maximum production, it is important that the maximum available number of equal length bolts be obtained from a standing tree with as little waste as possible. Undesirable waste may be occasioned by leaving a stump of an excessive height or discarding commercially acceptable upper portions of the tree with the tree top. In harvesting pulpwood, tress of a height of about 50 to 60 feet are frequently encountered, the trees being bucked into a number of even length bolts such as approximately 12 4-foot lengths. Because of the repetitive nature of the operation, it is important that the operational cycle for each tree by automated to assure minimum operating times and minimized chances of human error.

SUMMARY OF THE INVENTION

It is the general object of the present invention to provide a tree harvesting device for harvesting standing trees which minimizes the problems heretofore noted.

In achieving this general object, the present invention provides a tree harvesting apparatus for harvesting standing trees, the apparatus including severing means to sever a standing tree at spaced locations along its longitudinal axis and boom means connected to the severing means, the boom means being adapted to be pivotally supported on a vehicle. Of particular significant, is the provision of control means for automatically controlling elevation above ground level of the boom means according to a predetermined elevation independent of the initial orientation of the vehicle.

DESCRIPTION OF DRAWINGS

A more thorough understanding of one embodiment of the present invention may e gained by reference to the accompanying drawings, in which.

DETAILED DESCRIPTION OF THE INVENTION

Figure 1:
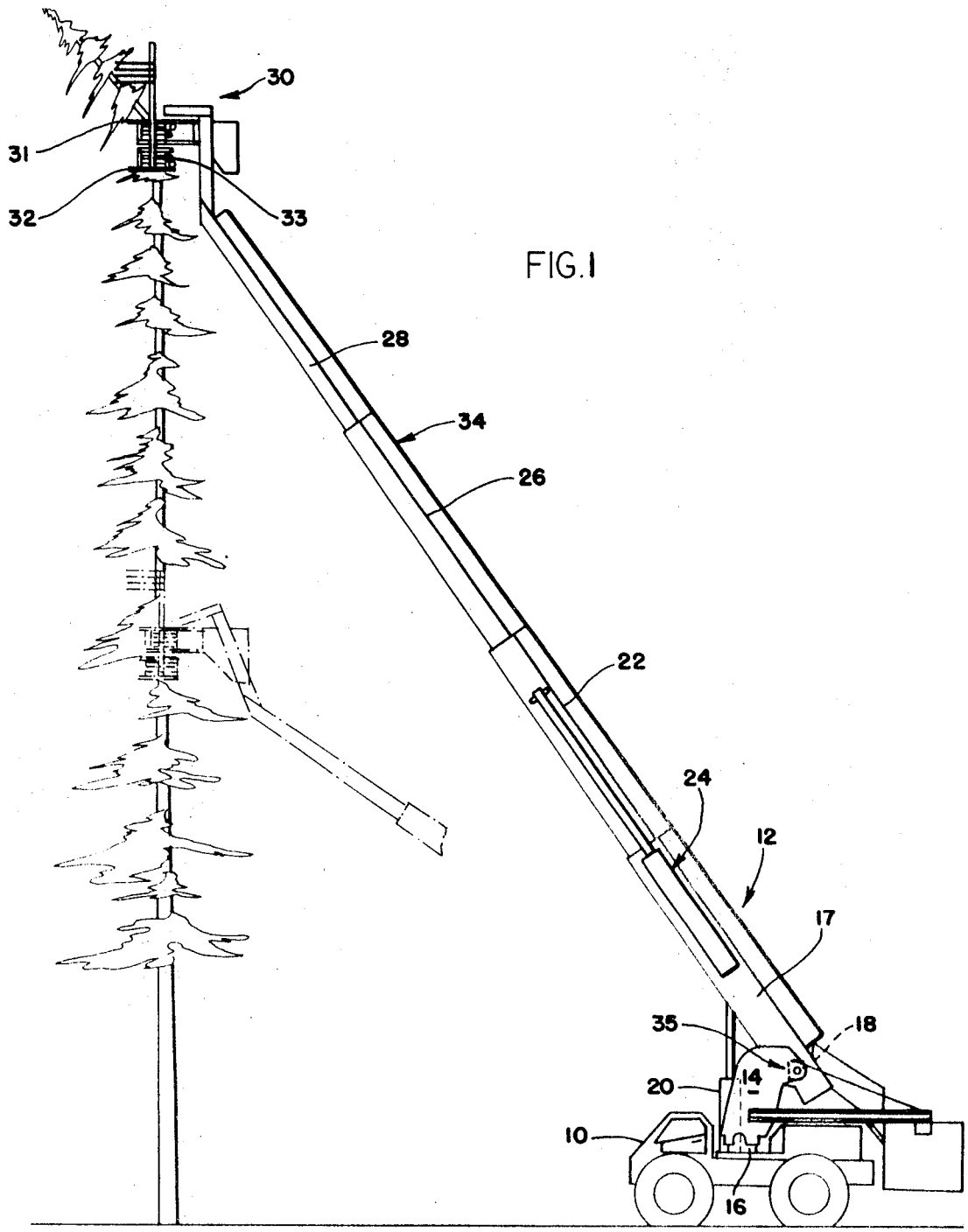
FIG. 1 is an elevational view of a tree harvesting and processing device according to the present invention shown in full lines adjacent the top of a standing tree, and a fragmentary showing in phantom lines of the device after a few bolts have been harvested from the tree.

Referring in more detail to FIG. 1 of the drawings, a tree harvesting and processing device forming the basis of the present invention, as generally disclosed in the previously identified Sutherland application, comprises a self-propelled vehicle 10 on which an extensible boom assembly 12 is mounted. The boom assembly 12 is of a conventional type and comprises boom support 14 mounted on a turntable 16 for rotation about a vertical axis relative to the vehicle 10 by a rotary hydraulic motor, not shown, A boom base section 17 is pivotally connected on the rear end of the boom support 14 by a pivot pin 18 for pivotal movement about a horizontal axis. A double acting boom hoist hydraulic cylinder assembly 20 connects the turntable 16 and the boom base section 17 to effect raising and lowering of the boom. Telescopically received in the boom base section 17 is a first extensible boom section 22 which is adapted to telescope in and out of the boom base section 17 by retraction or extension of a double acting hydraulic cylinder 24 connected between these sections. Similar hydraulic cylinders (not shown) may be provided for extension and retraction of multiple telescopic extension sections, such as second and third telescopic extensible sections 26 and 28, respectively. A generally conventional hydraulic control (not shown) may be provided to raise, lower, extend, retract, swing, hold or float the boom by controlling fluid flow to appropriate ends of appropriate hydraulic cylinders.

On the upper end of the third extensible section 28, a hydraulically actuated tree shear and clamp unit 30 is provided for topping, delimbing, scoring and severing or buckling a standing tree into pulpwood lengths or bolts, The shear and clamp unit 30 comprises upper and lower shear and clamp assemblies 31 and 32 connected together for relative vertical movement by a pair of double acting hydraulic cylinders 33. A telescopic chute or conveyor 34 is provided to direct severed or sheared bolts to a collection area or means.

Operation of the device, as disclosed in the heretofore identified Sutherland application generally requires the following. Initially, the vehicle is positioned within boom reach of a standing tree to be harvested. The boom assembly is then rotated, angled and/or extended until the shear and clamp unit 30 is positioned to grip the tree at a proper elevation for severing the top thereof. The weight of the device may be supported on the tree as the boom assembly 12 is placed in a "-float" or freely moveable condition. The shear and clamp assembly 31 is then actuated by any suitable hydraulic system (not shown) to sever the top of the tree, which is discarded, and then to descend the tree in a step-by-step manner to delimb and sever bolts therefrom which are directed by the chute 34 to a collection area. Bolt length is established by the vertical distance apart that the upper and lower shear and clamp assemblies 31 and 32 may be moved by vertical cylinders 33. The last bolt adjacent the butt of the tree is severed from the tree stump by the lower shear and clamp assembly 32.

To automatically and accurately position the shear and clamp unit 30 at a proper elevation for topping a standing tree and to assure that a preselected maximum number of even length bolts are obtained therefrom, the present invention provides a selectively adjustable boom elevation and bolt number selector control 35 positioned on the boom support 14 adjacent the horizontal boom pivot 18.

Figure 2:
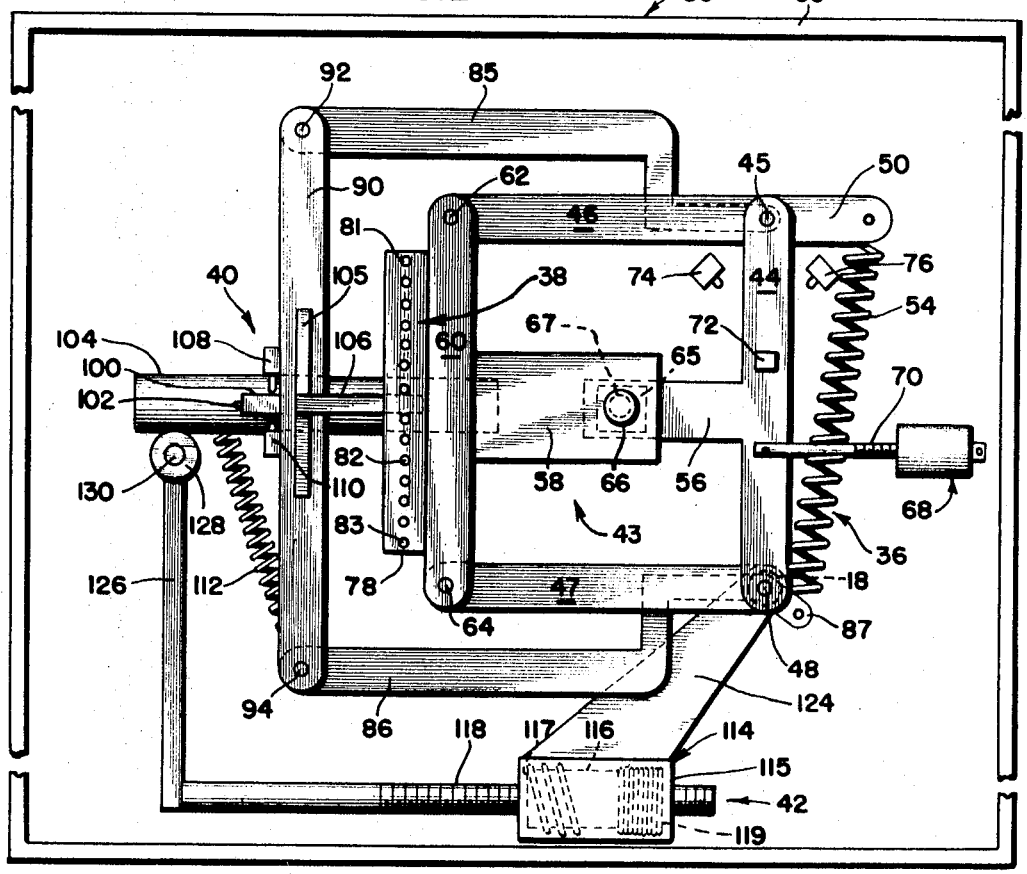
FIG. 2 is a schematic fragmentary side view of an elevation control for the tree harvesting and processing device shown in FIG. 1.

With reference to FIG. 2 of the drawings, the boom control 35 basically comprises a vehicle orientation compensating assembly 36 pivotally connected to a selectively adjustable elevation stop pin bank assembly 38 which cooperates with a switch bar assembly 40 for controlling boom movement. A boom elevation and length follower assembly 42 which is proportionately moveable in accordance with vertical pivoting and extension or retraction of the boom assembly 12 is provided to read boom movement and to cooperate with the switch rod assembly 40 to control boom height in accordance with adjustment of the elevation stop pin bank assembly 38. These assemblies are positioned in a housing 39 which may include a hinged door to provide access thereto.

More specifically, the vehicle orientation compensating linkage assembly comprises a first vertical link 44, the upper end of which is pivotally connected by an upper pivot pin 45 to the housing 39. An upper horizontal link 46 is pivotally mounted on the upper pivot pin 45 and lower horizontal link 47 is pivotally mounted on a lower pivot pin 48 pivotally connected to the lower end of the first vertical link 44. The upper horizontal link 46 is provided with a lateral extension 50, the free end of which supports a spring 54. A first ear 56 extends from one lateral side intermediate the length of the vertical link 44, the ear 56 overlapping a second ear 58 fixed intermediate the length of a second vertical link 60. The second vertical link 60 is pivotally connected between the upper and lower horizontal links 46 and 47 by second upper and lower pivot pins 62 and 64, respectively. The front face of the second ear 58 is provided with a brake or lock solenoid 66, on the rear face of which a friction surface 67 is provided, the friction surface 67 is spring loaded to an engaged position for engagement with a cooperating friction surface 65 on the front face of the first ear 56 whereby the vertical links 44 and 60 may be locked together.

A vehicle orientation compensating motor 68 is pivotally supported on the housing 39 for rotating in either direction, a threaded shaft 70, the free end of which is connected to the first vertical link 44. A conventional orientation responsive mercury switch 72 is mounted on the vertical link 44 for actuation of the motor 68. Orientation of the vehicle 10 in an unlevel condition induces the vertical link 44 to assume a vertically inclined position. Such an inclined position causes the mercury switch 72 to actuate the motor 68 to move the threaded shaft 70 in an appropriate direction to return the vertical link to an absolutely vertical condition. A pair of maximum vehicle misorientation electric switches 74 and 76 are positioned in the extremities of the path of swinging movement of the vertical link 44 whereby, upon contact with the link, the switches may actuate a warning device (not shown) to indicate an extreme or impractical orientation of the overall vehicle for harvesting.

The maximum elevation stop pin bank assembly 38 is mounted on the second vertical link 60 and comprises a bank housing 78 in which a plurality of equally vertically spaced, rearwardly extending stop pins 80 are mounted. Upper and lower stop pins 81 and 83 are fixedly mounted in the housing 78. Ten moveable stop pins 82 positioned between the upper and lower pins 81 and 83 are provided, each being adapted to be moved from a retracted position, shown in full lines in FIG. 3, to an extended position shown in phantom lines by an individual stop pin solenoid 84 selectively operable by the operator of the vehicle 10. The number of stop pins 80 correspond at least to the maximum number of bolts ever to be severed from a tree.

Figure 3:
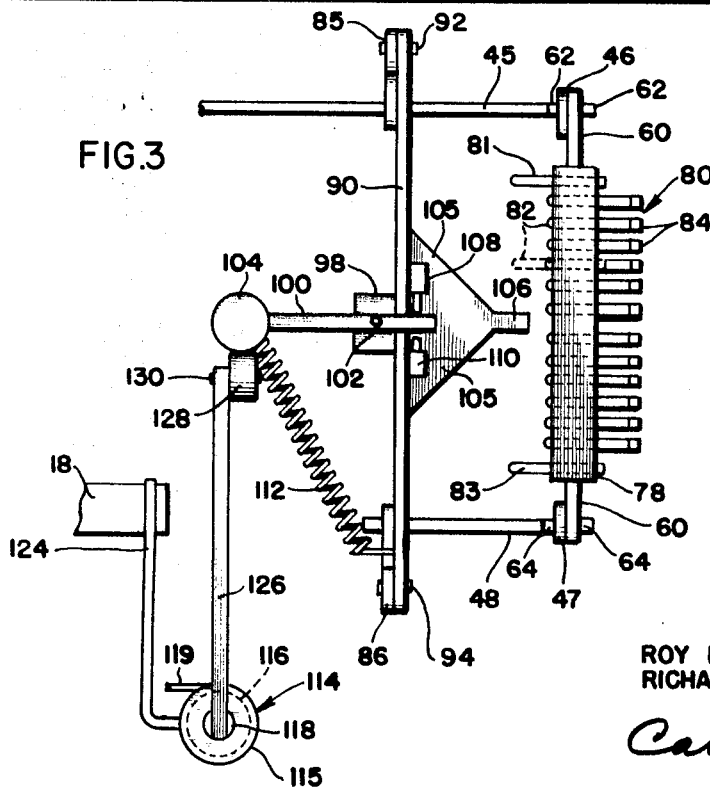
FIG. 3 is a schematic fragmentary front view of a portion of the elevation control shown in FIG. 2.

The switch bar assembly 40 comprises second upper and lower horizontal links 85 and 86, the inner ends of which are pivotally connected on upper and lower pivot pins 45 and 48, respectively. The second lower horizontal link 86 is provided with an extension 87 connected to the extension 50 on the first upper horizontal link 46 by the spring 54 whereby the stop pin bank 38 is urged to rotate upwardly or in a clockwise direction, as shown in FIG. 2, and the switch bar assembly 40 is urged in a counterclockwise direction. Connected between the outer ends of the second upper and lower horizontal links 85 and 86 by pivot pins 92 and 94 is a third vertical link 90. With reference to FIG. 3 of the drawings, from the rear face of the third vertical link 90, a switch pivot ear 98 projects. A horizontal pivot or switch arm 100 is pivotally connected to the ear 98 by a horizontal pivot pin 102 and a horizontally extending bar 104 is fixed in a perpendicular relation to the rear end of the pivot arm 100. On the front face of the third vertical link 90 is a triangular projection 105 to the front end of which a laterally extending, horizontal arm 106 is fixed to extend laterally into the path of the stop pins 80. Fixedly positioned the front face of the third vertical link 90 in the path of pivotal movement of the switch arm 100, is a pair of upper and lower switches 108 and 110 for activating a conventional electrohydraulic control for controlling movement of the boom hoist cylinder 20. Upper switch 108 is actuatable to move the boom upwardly and lower switch 110 is actuatable to move the boom downwardly. A spring 112 connects the horizontal bar 104 and the lower end of the link 90 to urge the horizontal arm 106 in a counterclockwise direction, as shown in FIG. 3, to thereby actuate the upper switch 108. It is seen that the control 35, when activated, is normally in the boom up position.

The elevation and length follower assembly 42 comprises a spring-tensioned cable drum assembly 114 adapted to extend or retract a threaded shaft 118 in accordance with extension or retraction of the boom assembly 12. The cable drum assembly 114 comprises a cylindrical housing 115 in which is positioned a cable drum 116 threadedly receiving the threaded shaft 118. A helical spring 117 urges the drum 116 to reel in a cable 119 reaved thereabout. The free end of the cable 119 is connected to the third extensible section 28 of the boom assembly 12 whereby extension of the boom assembly moves the threaded shaft 118 towards the left, as shown in FIG. 2, and retraction of the boom assembly moves the threaded shaft 118 towards the right. The cylindrical housing 115 is fixedly connected to the lower end of a support 124. The upper end of the support 124 is pivotally mounted through the boom pivot pin 18 so that the housing 115 pivots around the horizontal axis in accordance with the pivotal movement through a vertical plane of the boom assembly 12. On the outer end of the threaded shaft 118 is a vertical leg 126. A roller 128 is rotatably mounted on the vertical leg 126 by a roller pin 130 and contacts the horizontal bar 104 at a point somewhere along its length. It should be noted that the roller 128 moves vertically and horizontally in accordance with movement of the boom assembly 12 and carries the horizontal bar 104 of the switch assembly 40 along with such movement.

Operation of the elevation control 35 according to the present invention with a tree harvesting device, is as follows. Assuming the vehicle 10 is moved to a position adjacent a tree to be harvested wherein the vehicle is oriented in an unlevel position from front to rear. This unlevel condition is sensed by the mercury switch 72 on the first vertical link 44 and the vehicle orientation compensating motor is accordingly actuated to return the first vertical link 44 to an absolute vertical condition. Of course, if extreme adjustment of the first vertical link 44 is required to compensate for an extremely unlevel condition of the vehicle, the first vertical link 44 will be moved to a point wherein it actuates either of the maximum vehicle misorientation switches 74 and 76. A warning signal may thereby be actuated to indicate an impractical orientation of the vehicle for harvesting requiring vehicle relocation.

In a pulpwood operation, it is usual that all of the trees of a pulpwood stand are of substantially the same height. The usable, and therefore, the available number of equal length bolts obtainable from the average tree of the stand is accordingly established. The vehicle operator then selects the number of bolts to be cut and an appropriate one of the pin solenoids 84 is actuated to move the associated pin 82 to an extended position shown in phantom lines in FIG. 3. It should be noted that the pins 80 are vertically spaced apart a distance proportional to the incremental movement of the shear and clamp unit 30 to sever one bolt. Therefore, when the usable length of tree is determined, the appropriate moveable pin 82 is placed in an extended position in the path of movement of the horizontal arm 106.

With the control 35 deactivated, the boom assembly 12 is lowered by manual control of the hydraulic control system until the lower shear and clamp assembly 32 contacts the ground adjacent the tree to be harvested. Such ground elevation may, of course, differ in elevation from ground level at the vehicle or the ground level referenced at the preceding orientation of the vehicle. The roller 128 is now referenced to ground level since its vertical position always proportionately corresponds to the vertical position of shear and clamp unit 30. Ground level referecing the overall control is accomplished as follows. The brake solenoid 66 is activated to overcome the spring load urging engagement of the brake surfaces on the first and second ears 56 and 58 on the first and second vertical links 44 and 60 thereby freeing the stop pin assembly 38 and the switch bar assembly 40 for movement relative to the first link 44. The stop pin bank assembly 38 and the switch bar assembly 40 are allowed to rotate either in a clockwise or a counterclockwise direction, depending upon preceding ground reference, until the action of spring 54 on the extension 50 of the upper parallel link 46 and on the extension 87 of the lower parallel link 86 urges the horizontal arm 106 to contact the lower stop pin 83. Simultaneously, the combined weights of these units, reduced partially by the action of spring 54 on extension 50, provides the force required to establish contact between the horizontal bar 106 and roller 128. The brake solenoid 66 is deactivated thereby permitting the spring loaded brake surface to return to engagement to lock together the first and second vertical links 44 and 60. At this point, the linkage is locked in a position reference to ground level at the elevation of the lower shear and clamp assembly adjacent the base of the tree to be harvested regardless of vehicle elevation. In this regard, it is noted that while terrain adjacent the vehicle is rarely level, trees tend to grow vertical regardless of terrain. Advantageously, the present invention compensates for such variations in terrain.

The vehicle operator may then activate the control 35. Because the horizontal arm 104 is spring loaded to actuate the upper or "boom-up" switch 108, the boom is automatically raised. Raising the shear and clamp unit 31 by boom pivoting is continued automatically until the roller 128 carries the spring loaded horizontal bar 104 to an elevation wherein the horizontal arm 106 contacts the extended stop pin 82. Further upward pivoting of the boom assembly 12 and consequently the elevation follower 42 causes the pivot arm 100 to pivot in a clockwise direction (as shown in FIG. 3) about pivot pin 102 against the action of the spring 112 and to thereby actuate the lower or "boom-down" switch 110. It should be noted that further elongation or extension of the boom causes similar upward movement of the elevation follower roller 128 thereby causing the lower or boom-down switch 110 to be further activated and causing the harvesting assembly to crowd out towards the tree in a horizontal plane.

In this manner, regardless of initial orientation of the vehicle relative to the tree, ground level may be referenced and the shear and clamp unit 31 automatically raised to an exact elevation proper for topping and for providing the desired number of even length bolts with minimum stumpage.

We claim:

1. In a tree harvesting apparatus for harvesting standing trees, said apparatus including severing means for severing a standing tree at a plurality of spaced locations along its longitudinal axis, and boom means connected to the severing means, said boom means adapted to be supported on a vehicle for pivotal movement about horizontal and vertical axes;
   the improvement comprising:
      adjustable control means for automatically controlling elevation above ground level of said boom means according to a variable but predetermined maximum.

2. In a tree harvesting apparatus according to claim 1 wherein said boom means is longitudinally extensible.

3. A tree harvesting apparatus according to claim 2 wherein said control means further includes first selectively operable control means for controlling pivotal movement of said boom means about the horizontal axis; second selectively operable control means for controlling extension of said boom means; and control connecting means cooperating with said first and second control means for actuating one of said control means upon actuation of the other to maintain constant the elevation of said severing means.

4. In a tree harvesting apparatus according to claim 3, said control means further comprising compensating means for compensating for an unlevel condition of a vehicle on which the control is mounted.

5. In a tree harvesting apparatus according to claim 4 said control further reference means for referencing ground elevation at the base of a tree to be harvested and for controlling elevation of said boom means according to said reference elevation.

6. In a tree harvesting apparatus according to claim 5 further including selectively operable stop means for controlling the number of severing operations performed on the tree.

7. In a tree harvesting apparatus according to claim 6 further including boom follower means movable in accordance with pivoting and longitudinal extension of said boom means, said switch means cooperating with said follower means and said stop means to limit upward movement of said boom means.

8. In a tree harvesting apparatus according to claim 7 further including warning means for warning of an impractical unlevel orientation of the vehicle for the harvesting operation.

9. In a tree harvesting apparatus for harvesting a standing tree, said apparatus including severing means for severing a tree at at least three locations a selected distance apart, along its longitudinal axis, and boom means connected to said severing means, said boom means adapted to be supported on a vehicle;
   the improvement comprising:
      control means for selectively maintaining maximum distance above ground elevation of said boom means to a distance equal to a whole multiple greater than one of said distance apart between said locations.

10. In a tree harvesting apparatus for harvesting a standing tree, said apparatus including severing means for severing a standing tree at a plurality of spaced locations along its longitudinal axis, and boom means connected to said severing means, said boom means being extensible and adapted to be supported on a vehicle for pivotal movement about a horizontal axis;
   the improvement comprising:
      control means for automatically controlling movement of said boom means about said horizontal axis in accordance with the degree of extension of said boom means to maintain said severing means at a preestablished elevation during movement of said boom means about said horizontal axis.

11. A method of harvesting standing trees by severing a standing tree at a plurality of spaced locations a selected distance apart along its longitudinal axis by utilizing a boom supported severing means, said method comprising:
   referencing the severing means at a desired tree stump height at which the severing operation is to be completed;
   elevating the severing means to an elevation equal to a whole multiple greater than one of said distance above said stump height;
   removing the top of the standing tree; and
   completing said severing operation.